(12) United States Patent
Yu et al.

(10) Patent No.: US 12,199,283 B2
(45) Date of Patent: Jan. 14, 2025

(54) METHOD FOR DIRECTLY PREPARING NICKEL SULFATE FROM LOW NICKEL MATTE, NICKEL SULFATE AND APPLICATION THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yingsheng Zhong, Guangdong (CN); Yinghao Xie, Guangdong (CN); Aixia Li, Guangdong (CN); Xuemei Zhang, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/282,133

(22) PCT Filed: May 31, 2022

(86) PCT No.: PCT/CN2022/096308
§ 371 (c)(1),
(2) Date: Sep. 14, 2023

(87) PCT Pub. No.: WO2023/005406
PCT Pub. Date: Feb. 20, 2023

(65) Prior Publication Data
US 2024/0047675 A1  Feb. 8, 2024

(30) Foreign Application Priority Data

Jul. 29, 2021 (CN) .......................... 202110866663.1

(51) Int. Cl.
*H01M 4/58* (2010.01)
*C01G 53/10* (2006.01)

(52) U.S. Cl.
CPC .......... *H01M 4/5825* (2013.01); *C01G 53/10* (2013.01); *C01P 2006/40* (2013.01); *C01P 2006/80* (2013.01)

(58) Field of Classification Search
CPC ............................. H01M 4/5825; C01G 53/10
See application file for complete search history.

(56) References Cited

U.S. PATENT DOCUMENTS 4,201,648 A  5/1980  Nissen et al.
10,995,014 B1  5/2021  Fraser et al.

FOREIGN PATENT DOCUMENTS

CN  1082512 A  2/1994
CN  102329955 A  1/2012
(Continued)

OTHER PUBLICATIONS

International Search Report for PCT/CN2022/096308 mailed Aug. 19, 2022, ISA/CN.
(Continued)

*Primary Examiner* — James A Fiorito
(74) *Attorney, Agent, or Firm* — Yue (Robert) Xu; Apex Attorneys at Law, LLP

(57) ABSTRACT

The present invention provides a method for directly preparing nickel sulfate from low nickel matte, a nickel sulfate and an application thereof, the method comprising the following steps: a) pre-treating a low nickel matte to obtain ferronickel powder; b) mixing the ferronickel powder with a sulfuric acid solution, stirring, dissolving, and then evaporating, to obtain a supersaturated sulfate solution; c) cooling the supersaturated sulfate solution to −5° C.-0° C., and
(Continued)

performing suction filtration to obtain an insoluble solid; d) washing the insoluble solid with water, and removing impurities from the filtrate to obtain a nickel hydroxide precipitate; impurity removal comprising successively removing iron, and removing calcium and magnesium; e) washing the nickel hydroxide precipitate with water, acid-dissolving and evaporating to obtain nickel sulfate. The present invention increases the amount of nickel recovered, the purity of nickel sulfate being 18.10%-19.24% nickel, and the recovery rate being 94.8%-97.1%.

7 Claims, 2 Drawing Sheets

(56) References Cited

FOREIGN PATENT DOCUMENTS

| | | |
|---|---|---|
| CN | 107162067 A | 9/2017 |
| CN | 107312930 A | 11/2017 |
| CN | 107790740 A | 3/2018 |
| CN | 109110826 A | 1/2019 |
| CN | 111170378 A | 5/2020 |
| CN | 113772751 A | 12/2021 |
| EP | 2832700 A1 | 2/2015 |
| JP | 2017025367 A | 2/2017 |

OTHER PUBLICATIONS

Xiao, Wanhai et al. "Kinetics of nickel leaching from low-nickel matte in sulfuric acid solution under atmospheric pressure" May 7, 2020.

First Office Action dated Jun. 25, 2024 for Germany patent application No. 11 2022 001 037.1, English translation provided by Google Translate.

METHOD FOR DIRECTLY PREPARING NICKEL SULFATE FROM LOW NICKEL MATTE, NICKEL SULFATE AND APPLICATION THEREOF

This application is the national phase of International Application No. PCT/CN2022/096308, titled "METHOD FOR DIRECTLY PREPARING NICKEL SULFATE FROM LOW NICKEL MATTE, NICKEL SULFATE AND APPLICATION THEREOF", filed on May 31, 2022, which claims the priority to Chinese Patent Application No. 202110866663.1, titled "METHOD FOR DIRECTLY PREPARING NICKEL SULFATE FROM LOW NICKEL MATTE, NICKEL SULFATE AND APPLICATION THEREOF", filed on Jul. 29, 2021 with the China National Intellectual Property Administration, which are incorporated herein by reference in entirety.

FIELD

The present disclosure relates to the technical field of hydrometallurgy, specifically to a method for directly preparing nickel sulfate using low nickel matte, nickel sulfate and use thereof.

BACKGROUND

As a key metal in the production of positive electrode materials of lithium batteries, nickel has important strategic significance for promoting the healthy and sustainable development of the new energy automotive technology industry. At present, nickel mainly comes from nickel sulfide ore and laterite nickel ore, and nickel in laterite nickel ore accounts for more than 60% of the total known nickel in the world. Due to the continuous decrease in the output of nickel sulfide ore and the increasing demand for nickel in industrial production, laterite nickel ore will gradually become the main source of nickel.

Nowadays, the average nickel grade of proven land-based laterite nickel ore is about 1.3%, and the ore has the characteristics of low nickel, high silicon, high iron-nickel ratio and high magnesium-nickel ratio. The technique combining pyrometallurgy with hydrometallurgy for extracting nickel from laterite nickel ore is the mainstream method for recovering nickel, and has a high recovery rate of nickel, iron, and magnesium. First, the laterite nickel ore is reduced and smelted at a high temperature, in which the nickel iron oxide is reduced to a metallic state, thereby obtaining nickel matte with low nickel content (low nickel matte), and the mass percentage of nickel in low nickel matte is 5-20%. Low nickel matte is smelted to obtain nickel matte with high nickel content (high nickel matte) through strengthening techniques, and the mass percentage of nickel in high nickel matte is 45-70%. High nickel matte is often subjected to leaching by a method such as pressurized acid leaching, atmospheric acid leaching or high pressure-atmospheric combined leaching. The leached nickel salt, iron salt, and calcium salt are separated and extracted by ion exchange or solvent extraction. In addition, before the separation of nickel salt, iron salt, and calcium salt, the remaining acid needs to be neutralized. However, the above steps have the following shortcomings: 1. The process is complicated, and low nickel matte needs to be converted to high nickel matte. In the process of smelting low nickel matte to obtain high nickel matte, the discharged slag contains nickel and iron, resulting in a waste of part of the nickel in the low nickel matte; 2. Upon leaching from high nickel matte, part of nickel and iron are oxidized and contained in the high silicon slag, also causing loss; 3. Separation and extraction cannot effectively extract metals from high-concentration acids, and in the process of acid neutralization, a considerable amount of agents are needed, and a large amount of harmful inorganic salts are produced which need to be processed.

SUMMARY

The present disclosure aims to solve at least one of the technical problems existing in the above-mentioned prior art. For this reason, the present disclosure proposes a method for directly preparing nickel sulfate using low nickel matte. The process is simple, and omits the procedure of obtaining high nickel matte from low nickel matte through smelting, etc., which greatly saves costs, and meanwhile avoids the waste of nickel during this procedure, obtaining nickel sulfate with high purity and increasing the recovery amount of nickel.

A first aspect of the present disclosure provides a method for directly preparing nickel sulfate using low nickel matte, comprising the following steps:
a) pretreating low nickel matte to obtain ferronickel powder;
b) mixing the ferronickel powder with sulfuric acid solution, stirring to dissolve, and then evaporating it to obtain a supersaturated sulfate solution;
c) cooling the supersaturated sulfate solution to −5 to 0° C. and filtering it with suction to obtain an insoluble solid;
d) dissolving the insoluble solid, and removing impurities from the filtrate to obtain nickel hydroxide precipitation; the removal of impurities includes successively removing iron, removing calcium and magnesium;
e) water-washing, acid dissolving and evaporating the nickel hydroxide precipitate to obtain nickel sulfate.

The applicant of the present disclosure found in the research that after cooling the supersaturated sulfate solution to −5 to 0° C., it can roughly comprise three forms of substances, that is, the sulfuric acid solution having been cooled into ice, sulfuric acid and part of the sulfate solution maintaining a liquid form, and insoluble solids (most of the crystals formed by the sulfate solution and insoluble impurities). Through cooling, the sulfuric acid solution and water will be cooled into ice, but the presence of relatively large amount of sulfates will disturb the lattice structure of the water in the sulfate solution, making it fail to reach a lower energy level, and drain the excess sulfates into the unfrozen sulfate solution to form a sulfate-rich solution. The reason is: when there is no external stirring and the crystal growth rate is low, the flow in the liquid phase is very weak. Therefore, it can be considered that the mass transfer process is completely controlled by diffusion. When the solution begins to solidify at a certain temperature, the aqueous solution endeavors to condense in the form of pure water, and the excess solute is diffused into the solution above the solid-liquid interface to form a sulfate-rich layer. By cooling, more polymorphic sulfate crystals can be incorporated into insoluble solids: because the cooling and crystallization proceed in an acid environment, there is no need to dilute with water and dissolve sulfate for extraction. As a result, in an acid environment, the purpose of concentrating the sulfate solution is achieved, and the continuous crystallization of the sulfate in the acid is enhanced, which can increase the recovery of nickel and reduce waste. Subsequently, the insoluble solid is separated from the acid solution by filtration with suction.

Preferably, in step a), the low nickel matte is a low nickel matte obtained by reduction and smelting of laterite nickel ore; the pretreatment includes: grinding the low nickel matte with a ball mill to obtain ferronickel powder with a particle size >200 mesh, and then putting it into a heating furnace to dry at a high temperature of 300-650° C. for 1-2 h. During the drying process, the ferronickel powder is kept in contact with air and oxidize at a high temperature to obtain a dry ferronickel powder with a particle size >200 mesh.

Preferably, step b) comprises: adding the ferronickel powder into a top open container, and then adding the sulfuric acid solution to mix, stirring to dissolve, and then evaporating it to obtain a supersaturated sulfate solution; a solid-to-liquid ratio (w/v) of the ferronickel powder to the sulfuric acid solution is 1: (3-10), a molar concentration of the sulfuric acid solution is 0.01-0.08 mol/L, a temperature of the dissolution is 35-65° C., a temperature of the evaporation is 100-120° C., a time of the stirring is 20-60 min; the supersaturated sulfate solution comprises supersaturated nickel sulfate solution, supersaturated iron sulfate solution and supersaturated magnesium sulfate solution.

Cooling the supersaturated sulfate solution to −5 to 0° C. has an impact on the increase in the recovery of nickel. In addition to this, the applicant of the present disclosure also found that nickel can be selectively leached using a low molar concentration of sulfuric acid solution and low temperature conditions. According to the measured data, more than 96.4% of the nickel in the ferronickel powder is dissolved in a low molar concentration of sulfuric acid solution, and the amount of nickel in the low nickel matte remaining in the insoluble residue merely accounts for less than 4% of the nickel in the low nickel matte. The metals in the insoluble residue are mainly iron and magnesium. Therefore, leaching nickel by using low amount of sulfuric acid is realized. Meanwhile, the leaching amount of impurity metals such as iron, calcium, and magnesium will also be reduced, resulting in a decrease in the amount of reagents used in the subsequent removal of impurities, which solves the problem of high reagent consumption in the nickel recovery process, and reduces the cost of nickel recycling.

Preferably, step c) comprises: after the temperature of the supersaturated sulfate solution in the top open container drop to 20-25° C., cooling the supersaturated sulfate solution in the top open container to −5 to 0° C., then removing an ice layer in the upper layer, and filtering off the unfrozen solution in the middle layer with suction to obtain an insoluble solid in the bottom layer; the ice layer includes sulfuric acid, and is mainly formed by freezing sulfuric acid solution; the unfrozen solution in the middle layer is mainly composed of sulfuric acid and part of sulfate; the insoluble solid includes sulfate crystals and some insoluble impurities. The ice layer and the solution filtered off with suction can be reused in step b), saving costs.

The present disclosure adopts a top open container, because the bottom and sides of the open container have a certain heat preservation effect during the freezing of the solution system into ice. When the temperature is lowered to −5 to 0° C., the solution in the open direction can preferentially overcool down to the freezing point and nucleate and freeze. Therefore, the upper solution in the container will preferentially freeze, and the bottom and sides of the open container are not frozen.

Preferably, step d) comprises:
d1) washing the insoluble solid with water to remove the insoluble residue to obtain a filtrate; a solid-to-liquid ratio (w/v) of the insoluble solid to the water is 1: (4-8), a temperature of washing is 60-95° C.; mixing the filtrate with a dilute alkali solution to perform reaction, and then performing solid-liquid separation to obtain an iron-removed solution;
d2) mixing the iron-removed solution with a dilute alkali solution and fluoride salt to perform reaction, and then performing solid-liquid separation to obtain a calcium- and magnesium-removed solution;
d3) mixing the calcium- and magnesium-removed solution with a dilute alkali solution to perform reaction, and then performing solid-liquid separation to obtain nickel hydroxide precipitate.

Preferably, in step d1), the dilute alkali solution is selected from sodium hydroxide solution, potassium hydroxide solution, lithium hydroxide solution, and barium hydroxide solution, preferably sodium hydroxide solution. A molar concentration of the dilute alkali solution is 0.01-0.2 mol/L; a pH of the mixed reaction solution is 2.0-3.5; a potential of the filtrate is controlled at 0.25-0.4 V; a temperature of the reaction is 60-95° C.

Preferably, step d1) further comprises aging for 3-15 h after mixing and reaction.

Preferably, in step d2), the dilute alkali solution is selected from sodium hydroxide solution, potassium hydroxide solution, lithium hydroxide solution, and barium hydroxide solution, preferably sodium hydroxide solution. A molar concentration of the dilute alkali solution is 0.01-0.2 mol/L; the fluoride salt is selected from sodium fluoride and potassium fluoride; a pH of the mixed reaction solution is 4.8-5.5; a molar concentration ratio of the sum of magnesium ions and calcium ions to the fluoride ions in the mixed reaction solution is 1:1.5-5; a temperature of the reaction is 60-95° C.

Preferably, step d2) further comprises aging for 3-15 h after the mixing and reaction.

Preferably, in step d3), the dilute alkali solution is selected from sodium hydroxide solution, potassium hydroxide solution, lithium hydroxide solution, and barium hydroxide solution, preferably sodium hydroxide solution. A molar concentration of the dilute alkali solution is 0.01-0.2 mol/L; a pH of the mixed reaction solution is 7.0-8.5.

Preferably, step e) comprises: adding water with a temperature of 60-95° C. to the nickel hydroxide precipitate to wash impurities, dissolving the filtered nickel hydroxide by adding a 0.01-0.1 mol/L dilute sulfuric acid solution to obtain nickel sulfate solution, and then evaporating the nickel sulfate solution to obtain nickel sulfate.

The second aspect of the present disclosure provides a nickel sulfate prepared by the method for directly preparing nickel sulfate using low nickel matte as described in the present disclosure.

The third aspect of the present disclosure provides use of the nickel sulfate in batteries, preferably in lithium batteries.

Compared with the prior art, the beneficial effects of the present disclosure are as follows:

The method for directly preparing nickel sulfate using low nickel matte of the present disclosure has a simple process, and omits the procedure of obtaining high nickel matte from low nickel matte through smelting, etc., which greatly saves costs, and avoids the waste of nickel during this procedure, meanwhile obtaining nickel sulfate with high purity and increasing the recovery amount of nickel. The purity of the nickel sulfate is 18.10-19.24% calculated as nickel, and the recovery rate is 94.8-97.1%.

DETAILED DESCRIPTION

In order to make the technical solutions of the present disclosure more clearly understood by those skilled in the art, the following examples are listed for description. It should be pointed out that the following examples do not limit the scope of protection claimed in the present disclosure.

Unless otherwise specified, the components, reagents or devices used in the following examples can be obtained from conventional commercial channels, or can be obtained by existing known methods.

Example 1

Figure 1:
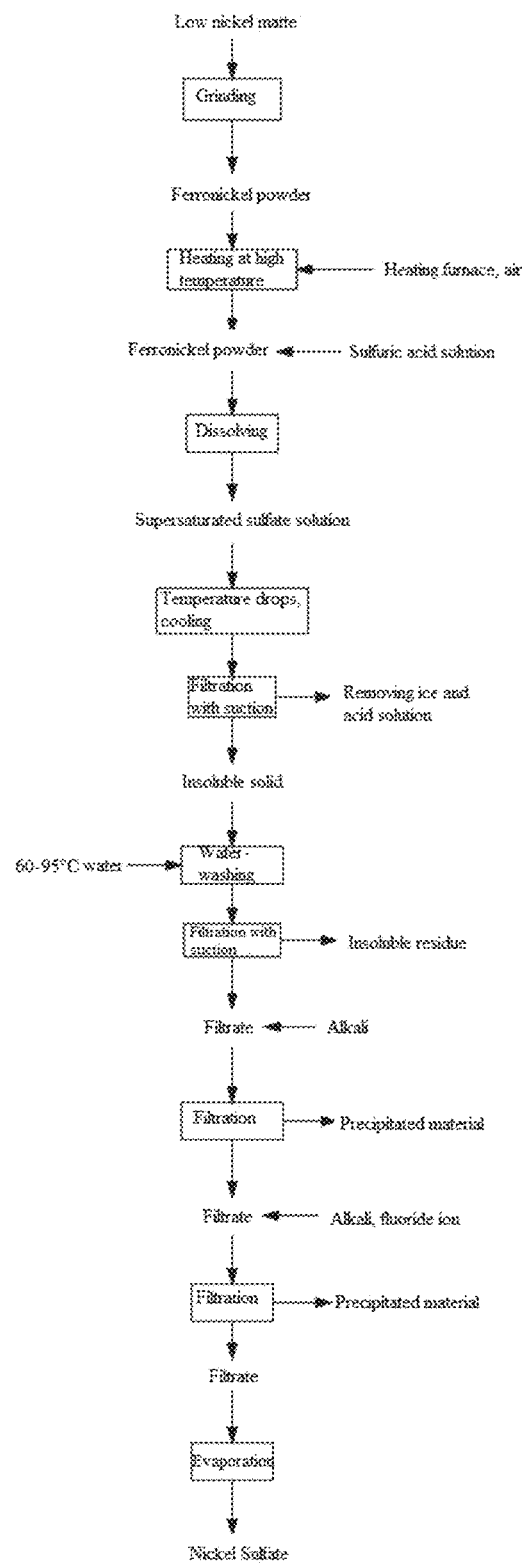
FIG. 1 is a schematic flow chart of the method for directly preparing nickel sulfate using low nickel matte in Example 1 of the present disclosure.

Reference could be made to FIG. 1 for the process flow. FIG. 1 is a schematic process flow chart of the method for directly preparing nickel sulfate using low nickel matte in this example.

Figure 2:
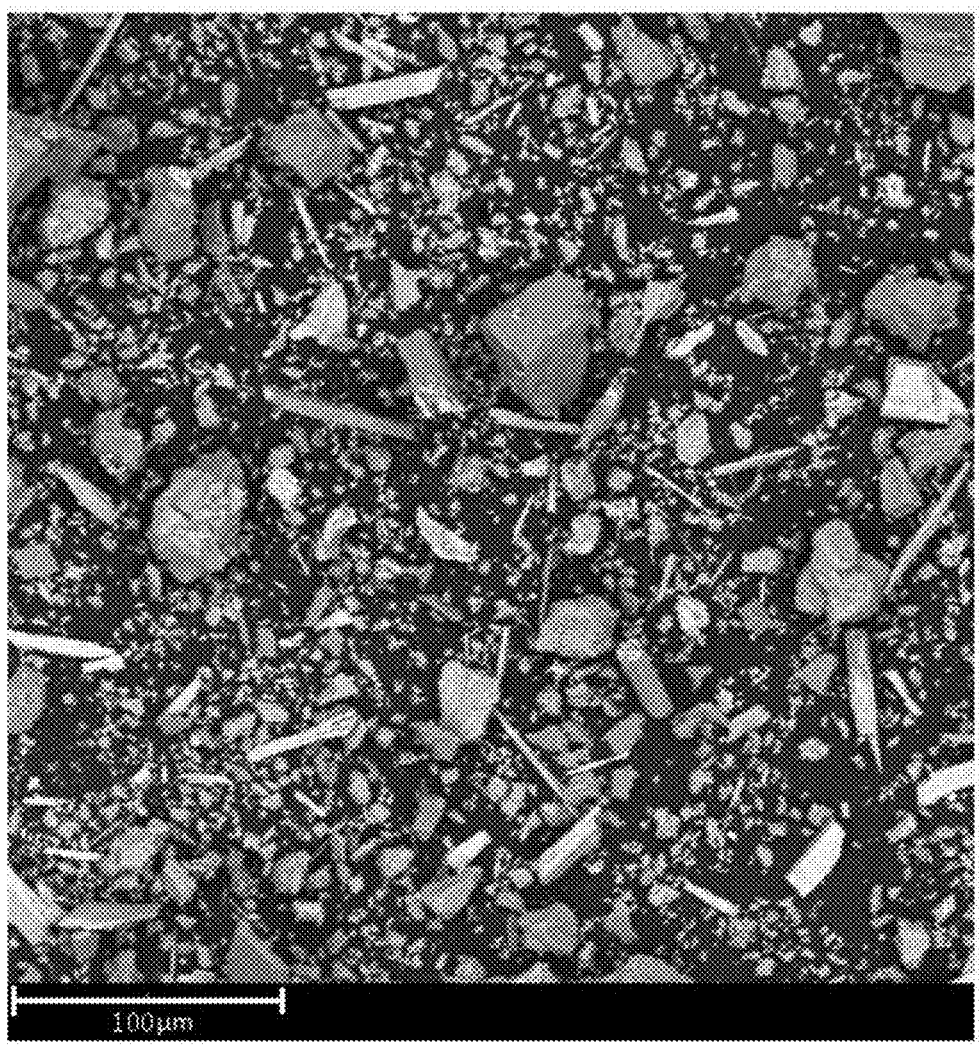
FIG. 2 is an SEM image of low nickel matte in Example 1 of the present disclosure.

Provided is a method for directly preparing nickel sulfate using low nickel matte, comprising the following steps:
- a) The low nickel matte obtained from the reduction and smelting of laterite nickel ore was ground with a ball mill to obtain ferronickel powder with a particle size >200 mesh, which was then put into a heating furnace and dried at a high temperature of 450° C. for 1.5 h. During the drying process, the ferronickel powder was kept in contact with air and oxidized at a high temperature to obtain 3.5 kg of dry ferronickel powder. Reference could be made to FIG. 2. FIG. 2 is an SEM (scanning electron microscope) image of low nickel matte, and it can be seen from the figure that the low nickel matte is pulverized granules, partly column.
- b) The ferronickel powder was added to a top open container, and a sulfuric acid solution with a molar concentration of 0.01 mol/L was added to mix according to the solid-to-liquid ratio (w/v) of 1:6. The mixture was stirred at 35° C. for 40 min, and then evaporated at 107° C. after dissolution to obtain a supersaturated sulfate solution including supersaturated nickel sulfate solution, supersaturated iron sulfate solution, and supersaturated magnesium sulfate solution;
- c) After the temperature of the supersaturated sulfate solution in the open top container dropped to 22° C., the supersaturated sulfate solution in the top open container was cooled to −3° C. After that, an ice layer in the upper layer was removed and the unfrozen solution was filtered off to obtain an insoluble solid; the ice layer included sulfuric acid, and the insoluble solid included sulfate crystals;
- d) According to the solid-liquid ratio (w/v) of 1:5.5, the insoluble solid was washed with water with a temperature of 80° C. to remove the insoluble residue to obtain a filtrate. 0.1 mol/L sodium hydroxide solution was added to the filtrate until the pH was 2.7, and the potential was controlled at 0.36 V. The precipitation reaction was carried out at a temperature of 84° C. After 8 h of aging, the precipitated materials (iron hydroxide, and iron was recycled) were removed to obtain an iron-removed solution;
- 0.1 mol/L sodium hydroxide solution and sodium fluoride were added to the iron-removed solution until the pH was 5.4, and the molar concentration ratio of the sum of magnesium ions and calcium ions to fluoride ions in the mixed solution was 1:2. The precipitation reaction was carried out at a temperature of 65° C. After 8 h of aging, the precipitation materials (calcium fluoride and magnesium fluoride, and magnesium and calcium were recycled) were removed to obtain a calcium- and magnesium-removed solution;
- 0.1 mol/L sodium hydroxide solution was added to the calcium- and magnesium-removed solution until the pH was 8.4, and the solution was filtered off with suction to obtain nickel hydroxide precipitate.
- e) According to the solid-liquid ratio (w/v) of 1:1.5, water with a temperature of 85° C. was added to the nickel hydroxide precipitation, which was then washed with water to remove impurities. 0.01 mol/L dilute sulfuric acid solution was added to the filtered nickel hydroxide precipitate for dissolution to obtain a nickel sulfate solution, which was then evaporated to obtain nickel sulfate.

Example 2

Provided is a method for directly preparing nickel sulfate using low nickel matte, comprising the following steps:
- a) The low nickel matte obtained from the reduction and smelting of laterite nickel ore was ground with a ball mill to obtain ferronickel powder with a particle size >200 mesh, which was then put into a heating furnace and dried at a high temperature of 450° C. for 1.25 h. During the drying process, the ferronickel powder was kept in contact with air and oxidized at a high temperature to obtain 4.6 kg of dry ferronickel powder;
- b) The ferronickel powder was added to a top open container, and a sulfuric acid solution with a molar concentration of 0.04 mol/L was added to mix according to the solid-to-liquid ratio (w/v) of 1:4.5. The mixture was stirred at 46° C. for 20 min, and then evaporated at 105° C. after dissolution to obtain a supersaturated sulfate solution including supersaturated nickel sulfate solution, supersaturated iron sulfate solution, and supersaturated magnesium sulfate solution;
- c) After the temperature of the supersaturated sulfate solution in the open top container dropped to 20° C., the supersaturated sulfate solution in the top open container was cooled to −5° C. After that, an ice layer in the upper layer was removed and the unfrozen solution was filtered off to obtain an insoluble solid; the ice layer included sulfuric acid, and the insoluble solid included sulfate crystals;
- d) According to the solid-liquid ratio (w/v) of 1:6, the insoluble solid was washed with water with a temperature of 65° C. to remove the insoluble residue to obtain a filtrate. 0.01 mol/L sodium hydroxide solution was added to the filtrate until the pH was 3.1, and the potential was controlled at 0.28 V. The precipitation reaction was carried out at a temperature of 80° C. After 3 h of aging, the precipitated materials (iron hydroxide, and iron was recycled) were removed to obtain an iron-removed solution;
- 0.01 mol/L sodium hydroxide solution and sodium fluoride were added to the iron-removed solution until the pH was 4.9, and the molar concentration ratio of the sum of magnesium ions and calcium ions to fluoride ions in the mixed solution was 1:2.5. The precipitation reaction was carried out at a temperature of 60° C. After 3 h of aging, the precipitation materials (calcium fluoride and magnesium fluoride, and magnesium and calcium were recycled) were removed to obtain a calcium- and magnesium-removed solution;

0.01 mol/L sodium hydroxide solution was added to the calcium- and magnesium-removed solution until the pH was 7.7, and the solution was filtered off with suction to obtain nickel hydroxide precipitate.

e) According to the solid-liquid ratio (w/v) of 1:1.5, water with a temperature of 80° C. was added to the nickel hydroxide precipitation, which was then washed with water to remove impurities. 0.04 mol/L dilute sulfuric acid solution was added to the filtered nickel hydroxide precipitate for dissolution to obtain a nickel sulfate solution, which was then evaporated to obtain nickel sulfate.

Example 3

Provided is a method for directly preparing nickel sulfate using low nickel matte, comprising the following steps:
a) The low nickel matte obtained from the reduction and smelting of laterite nickel ore was ground with a ball mill to obtain ferronickel powder with a particle size >200 mesh, which was then put into a heating furnace and dried at a high temperature of 450° C. for 1.5 h. During the drying process, the ferronickel powder was kept in contact with air and oxidized at a high temperature to obtain 5.5 kg of dry ferronickel powder;
b) The ferronickel powder was added to a top open container, and a sulfuric acid solution with a molar concentration of 0.05 mol/L was added to mix according to the solid-to-liquid ratio (w/v) of 1:8. The mixture was stirred at 43° C. for 60 min, and then evaporated at 120° C. after dissolution to obtain a supersaturated sulfate solution including supersaturated nickel sulfate solution, supersaturated iron sulfate solution, and supersaturated magnesium sulfate solution;
c) After the temperature of the supersaturated sulfate solution in the open top container dropped to 25° C., the supersaturated sulfate solution in the top open container was cooled to −1° C. After that, an ice layer in the upper layer was removed and the unfrozen solution was filtered off to obtain an insoluble solid; the ice layer included sulfuric acid, and the insoluble solid included sulfate crystals;
d) According to the solid-liquid ratio (w/v) of 1:5.5, the insoluble solid was washed with water with a temperature of 95° C. to remove the insoluble residue to obtain a filtrate. 0.2 mol/L sodium hydroxide solution was added to the filtrate until the pH was 3.4, and the potential was controlled at 0.39 V. The precipitation reaction was carried out at a temperature of 84° C. After 12 h of aging, the precipitated materials (iron hydroxide, and iron was recycled) were removed to obtain an iron-removed solution;

0.2 mol/L sodium hydroxide solution and sodium fluoride were added to the iron-removed solution until the pH was 5.5, and the molar concentration ratio of the sum of magnesium ions and calcium ions to fluoride ions in the mixed solution was 1:1.8. The precipitation reaction was carried out at a temperature of 95° C. After 12 h of aging, the precipitation materials (calcium fluoride and magnesium fluoride, and magnesium and calcium were recycled) were removed to obtain a calcium- and magnesium-removed solution;

0.2 mol/L sodium hydroxide solution was added to the calcium- and magnesium-removed solution until the pH was 8.5, and the solution was filtered off with suction to obtain nickel hydroxide precipitate.

e) According to the solid-liquid ratio (w/v) of 1:1.2, water with a temperature of 78° C. was added to the nickel hydroxide precipitation, which was then washed with water to remove impurities. 0.05 mol/L dilute sulfuric acid solution was added to the filtered nickel hydroxide precipitate for dissolution to obtain a nickel sulfate solution, which was then evaporated to obtain nickel sulfate.

Example 4 (which is Different from Example 1 in that the Molar Concentration of the Sulfuric Acid Solution in Step b) was Higher)

Provided is a method for directly preparing nickel sulfate using low nickel matte, comprising the following steps:
a) The low nickel matte obtained from the reduction and smelting of laterite nickel ore was ground with a ball mill to obtain ferronickel powder with a particle size >200 mesh, which was then put into a heating furnace and dried at a high temperature of 450° C. for 1.5 h. During the drying process, the ferronickel powder was kept in contact with air and oxidized at a high temperature to obtain 3.5 kg of dry ferronickel powder;
b) The ferronickel powder was added to a top open container, and a sulfuric acid solution with a molar concentration of 0.1 mol/L was added to mix according to the solid-to-liquid ratio (w/v) of 1:6. The mixture was stirred at 35° C. for 40 min, and then evaporated at 107° C. after dissolution to obtain a supersaturated sulfate solution including supersaturated nickel sulfate solution, supersaturated iron sulfate solution, and supersaturated magnesium sulfate solution;
c) After the temperature of the supersaturated sulfate solution in the open top container dropped to 22° C., the supersaturated sulfate solution in the top open container was cooled to −3° C. After that, an ice layer in the upper layer was removed and the unfrozen solution was filtered off to obtain an insoluble solid; the ice layer included sulfuric acid, and the insoluble solid included sulfate crystals;
d) According to the solid-liquid ratio (w/v) of 1:5.5, the insoluble solid was washed with water with a temperature of 80° C. to remove the insoluble residue to obtain a filtrate. 0.1 mol/L sodium hydroxide solution was added to the filtrate until the pH was 2.7, and the potential was controlled at 0.36 V. The precipitation reaction was carried out at a temperature of 84° C. After 8 h of aging, the precipitated materials (iron hydroxide, and iron was recycled) were removed to obtain an iron-removed solution;

0.1 mol/L sodium hydroxide solution and sodium fluoride were added to the iron-removed solution until the pH was 5.4, and the molar concentration ratio of the sum of magnesium ions and calcium ions to fluoride ions in the mixed solution was 1:2. The precipitation reaction was carried out at a temperature of 65° C. After 8 h of aging, the precipitation materials (calcium fluoride and magnesium fluoride, and magnesium and calcium were recycled) were removed to obtain a calcium- and magnesium-removed solution;

0.1 mol/L sodium hydroxide solution was added to the calcium- and magnesium-removed solution until the pH was 8.4, and the solution was filtered off with suction to obtain nickel hydroxide precipitate.

e) According to the solid-liquid ratio (w/v) of 1:1.5, water with a temperature of 85° C. was added to the nickel hydroxide precipitation, which was then washed with water to remove impurities. 0.01 mol/L dilute sulfuric acid solution was added to the filtered nickel hydroxide precipitate for dissolution to obtain a nickel sulfate solution, which was then evaporated to obtain nickel sulfate.

Example 5 (which is Different from Example 1 in that the Temperature of the Dissolution in Step b) was Higher)

Provided is a method for directly preparing nickel sulfate using low nickel matte, comprising the following steps:
a) The low nickel matte obtained from the reduction and smelting of laterite nickel ore was ground with a ball mill to obtain ferronickel powder with a particle size >200 mesh, which was then put into a heating furnace and dried at a high temperature of 450° C. for 1.5 h. During the drying process, the ferronickel powder was kept in contact with air and oxidized at a high temperature to obtain 3.5 kg of dry ferronickel powder;
b) The ferronickel powder was added to a top open container, and a sulfuric acid solution with a molar concentration of 0.01 mol/L was added to mix according to the solid-to-liquid ratio (w/v) of 1:6. The mixture was stirred at 35° C. for 40 min, and then evaporated at 107° C. after dissolution to obtain a supersaturated sulfate solution including supersaturated nickel sulfate solution, supersaturated iron sulfate solution, and supersaturated magnesium sulfate solution;
c) After the temperature of the supersaturated sulfate solution in the open top container dropped to 22° C., the supersaturated sulfate solution in the top open container was cooled to −3° C. After that, an ice layer in the upper layer was removed and the unfrozen solution was filtered off to obtain an insoluble solid; the ice layer included sulfuric acid, and the insoluble solid included sulfate crystals;
d) According to the solid-liquid ratio (w/v) of 1:5.5, the insoluble solid was washed with water with a temperature of 80° C. to remove the insoluble residue to obtain a filtrate. 0.1 mol/L sodium hydroxide solution was added to the filtrate until the pH was 2.7, and the potential was controlled at 0.36 V. The precipitation reaction was carried out at a temperature of 84° C. After 8 h of aging, the precipitated materials (iron hydroxide, and iron was recycled) were removed to obtain an iron-removed solution;
0.1 mol/L sodium hydroxide solution and sodium fluoride were added to the iron-removed solution until the pH was 5.4, and the molar concentration ratio of the sum of magnesium ions and calcium ions to fluoride ions in the mixed solution was 1:2. The precipitation reaction was carried out at a temperature of 65° C. After 8 h of aging, the precipitation materials (calcium fluoride and magnesium fluoride, and magnesium and calcium were recycled) were removed to obtain a calcium- and magnesium-removed solution;
0.1 mol/L sodium hydroxide solution was added to the calcium- and magnesium-removed solution until the pH was 8.4, and the solution was filtered off with suction to obtain nickel hydroxide precipitate.
e) According to the solid-liquid ratio (w/v) of 1:1.5, water with a temperature of 85° C. was added to the nickel hydroxide precipitation, which was then washed with water to remove impurities. 0.01 mol/L dilute sulfuric acid solution was added to the filtered nickel hydroxide precipitate for dissolution to obtain a nickel sulfate solution, which was then evaporated to obtain nickel sulfate.

Comparative Example 1 (which is Differs from Example 1 in that Step c) had No Cooling Treatment)

Provided is a method for directly preparing nickel sulfate using low nickel matte, comprising the following steps:
a) The low nickel matte obtained from the reduction and smelting of laterite nickel ore was ground with a ball mill to obtain ferronickel powder with a particle size >200 mesh, which was then put into a heating furnace and dried at a high temperature of 450° C. for 1.5 h. During the drying process, the ferronickel powder was kept in contact with air and oxidized at a high temperature to obtain 3.5 kg of dry ferronickel powder;
b) The ferronickel powder was added to a top open container, and a sulfuric acid solution with a molar concentration of 0.01 mol/L was added to mix according to the solid-to-liquid ratio (w/v) of 1:6. The mixture was stirred at 35° C. for 40 min, and then evaporated at 105° C. after dissolution to obtain a supersaturated sulfate solution including supersaturated nickel sulfate solution, supersaturated iron sulfate solution, and supersaturated magnesium sulfate solution;
c) After the temperature of the supersaturated sulfate solution in the open top container dropped to 22° C., the solution was filtered off to obtain an insoluble solid; the insoluble solid included sulfate crystals;
d) According to the solid-liquid ratio (w/v) of 1:5.5, the insoluble solid was washed with water with a temperature of 80° C. to remove the insoluble residue to obtain a filtrate. 0.1 mol/L sodium hydroxide solution was added to the filtrate until the pH was 2.7, and the potential was controlled at 0.36 V. The precipitation reaction was carried out at a temperature of 84° C. After 8 h of aging, the precipitated materials (iron hydroxide, and iron was recycled) were removed to obtain an iron-removed solution;
0.1 mol/L sodium hydroxide solution and sodium fluoride were added to the iron-removed solution until the pH was 8.4, and the molar concentration ratio of the sum of magnesium ions and calcium ions to fluoride ions in the mixed solution was 1:2. The precipitation reaction was carried out at a temperature of 65° C. After 8 h of aging, the precipitation materials (magnesium hydroxide and calcium hydroxide, and magnesium and calcium were recycled) were removed to obtain a calcium- and magnesium-removed solution;
0.1 mol/L sodium hydroxide solution was added to the calcium- and magnesium-removed solution until the pH was 8.4, and the solution was filtered off with suction to obtain nickel hydroxide precipitate.
e) According to the solid-liquid ratio (w/v) of 1:1.5, water with a temperature of 85° C. was added to the nickel hydroxide precipitation, which was then washed with water to remove impurities. 0.01 mol/L dilute sulfuric acid solution was added to the filtered nickel hydroxide precipitate for dissolution to obtain a nickel sulfate solution, which was then evaporated to obtain nickel sulfate.

Comparative Example 2 (which is Different from Example 1 in that the Temperature of the Cooling Treatment in Step c) was Too High)

Provided is a method for directly preparing nickel sulfate using low nickel matte, comprising the following steps:
a) The low nickel matte obtained from the reduction and smelting of laterite nickel ore was ground with a ball mill to obtain ferronickel powder with a particle size >200 mesh, which was then put into a heating furnace and dried at a high temperature of 450° C. for 1.5 h. During the drying process, the ferronickel powder was kept in contact with air and oxidized at a high temperature to obtain 3.5 kg of dry ferronickel powder;
b) The ferronickel powder was added to a top open container, and a sulfuric acid solution with a molar concentration of 0.01 mol/L was added to mix according to the solid-to-liquid ratio (w/v) of 1:6. The mixture was stirred at 35° C. for 40 min, and then evaporated at 107° C. after dissolution to obtain a supersaturated sulfate solution including supersaturated nickel sulfate solution, supersaturated iron sulfate solution, and supersaturated magnesium sulfate solution;
c) After the temperature of the supersaturated sulfate solution in the open top container dropped to 22° C., the supersaturated sulfate solution in the top open container was cooled to 1° C. After that, the solution was filtered off to obtain an insoluble solid; the insoluble solid included sulfate crystals;
d) According to the solid-liquid ratio (w/v) of 1:5.5, the insoluble solid was washed with water with a temperature of 80° C. to remove the insoluble residue to obtain a filtrate. 0.1 mol/L sodium hydroxide solution was added to the filtrate until the pH was 2.8, and the potential was controlled at 0.31 V. The precipitation reaction was carried out at a temperature of 84° C. After 8 h of aging, the precipitated materials (iron hydroxide, and iron was recycled) were removed to obtain an iron-removed solution;
0.1 mol/L sodium hydroxide solution and sodium fluoride were added to the iron-removed solution until the pH was 5.4, and the molar concentration ratio of the sum of magnesium ions and calcium ions to fluoride ions in the mixed solution was 1:2. The precipitation reaction was carried out at a temperature of 65° C. After 10 h of aging, the precipitation materials (magnesium fluoride and calcium fluoride, and magnesium and calcium were recycled) were removed to obtain a calcium- and magnesium-removed solution;
0.1 mol/L sodium hydroxide solution was added to the calcium- and magnesium-removed solution until the pH was 8.4, and the solution was filtered off with suction to obtain nickel hydroxide precipitate.
e) According to the solid-liquid ratio (w/v) of 1:1.5, water with a temperature of 85° C. was added to the nickel hydroxide precipitation, which was then washed with water to remove impurities. 0.01 mol/L dilute sulfuric acid solution was added to the filtered nickel hydroxide precipitate for dissolution to obtain a nickel sulfate solution, which was then evaporated to obtain nickel sulfate.

The element mass content and nickel in the preparation process of Examples 1-5 and Comparative Example 1-2 were detected by ICP-OES, and the recovery rate of nickel was calculated. The results are shown in Table 1.

TABLE 1

Percentage of each element and recovery rate of nickel in Examples 1-5 and Comparative Examples 1-2

| | Sample | Ni (%) | Fe (%) | Mg (%) | Ca (%) | Recovery rate of nickel (%) |
|---|---|---|---|---|---|---|
| Sulfate solution before the temperature dropped in step c) | Example 1 | 3.55 | 13.64 | 3.44 | 0.14 | / |
| | Example 2 | 3.87 | 15.36 | 3.7 | 0.17 | / |
| | Example 3 | 3.56 | 16.41 | 2.74 | 0.21 | / |
| | Example 4 | 3.26 | 18.89 | 3.68 | 0.26 | / |
| | Example 5 | 3.14 | 18.76 | 3.72 | 0.14 | / |
| | Comparative Example 1 | 3.37 | 13.85 | 2.46 | 0.11 | / |
| | Comparative Example 2 | 3.56 | 15.77 | 2.98 | 0.14 | / |
| Ice layer after cooling in step c) | Example 1 | 0.29 | 4.45 | 0.54 | 0.06 | / |
| | Example 2 | 0.28 | 5.72 | 0.30 | 0.07 | / |
| | Example 3 | 0.32 | 4.65 | 0.47 | 0.10 | / |
| | Example 4 | 0.35 | 5.21 | 0.41 | 0.08 | / |
| | Example 5 | 0.21 | 3.84 | 0.59 | 0.04 | / |
| | Comparative Example 1 | / | / | / | / | / |
| | Comparative Example 2 | / | / | / | / | / |
| Unfrozen solution after cooling in step c) | Example 1 | 0.71 | 8.36 | 1.77 | 0.1 | / |
| | Example 2 | 0.68 | 9.61 | 1.45 | 0.13 | / |
| | Example 3 | 0.82 | 8.74 | 1.63 | 0.09 | / |
| | Example 4 | 0.65 | 11.65 | 1.38 | 0.12 | / |
| | Example 5 | 0.59 | 10.23 | 1.67 | 0.17 | / |
| | Comparative Example 1 | 0.46 | 8.33 | 1.22 | 0.07 | / |
| | Comparative Example 2 | 0.59 | 9.36 | 1.96 | 0.14 | / |
| Nickel sulfate solution before evaporation in step e) | Example 1 | 8.61 | 0.011 | 0.008 | 0.001 | / |
| | Example 2 | 8.94 | 0.017 | 0.011 | 0.0008 | / |
| | Example 3 | 8.86 | 0.014 | 0.007 | 0.0008 | / |
| | Example 4 | 8.47 | 0.016 | 0.009 | 0.0007 | / |
| | Example 5 | 8.31 | 0.008 | 0.0013 | 0.0006 | / |

TABLE 1-continued

Percentage of each element and recovery rate of nickel in Examples 1-5 and Comparative Examples 1-2

| | Sample | Ni (%) | Fe (%) | Mg (%) | Ca (%) | Recovery rate of nickel (%) |
|---|---|---|---|---|---|---|
| | Comparative Example 1 | 6.86 | 0.014 | 0.017 | 0.0005 | / |
| | Comparative Example 2 | 7.39 | 0.028 | 0.0031 | 0.0005 | / |
| Nickel sulfate obtained in step e) | Example 1 | 18.76 | 0.026 | 0.003 | 0.0021 | 96.7 |
| | Example 2 | 19.24 | 0.036 | 0.0041 | 0.003 | 96.4 |
| | Example 3 | 18.93 | 0.033 | 0.0033 | 0.0011 | 97.1 |
| | Example 4 | 18.35 | 0.047 | 0.0037 | 0.006 | 95.5 |
| | Example 5 | 18.10 | 0.023 | 0.0045 | 0.0015 | 94.8 |
| | Comparative Example 1 | 16.96 | 0.047 | 0.0017 | 0.0017 | 92.9 |
| | Comparative Example 2 | 17.73 | 0.067 | 0.0073 | 0.0021 | 91.0 |

It can be seen from Table 1 that the purity of the nickel sulfate prepared in Examples 1-5 of the present disclosure is 18.76%, 19.24%, 18.93%, 18.35%, and 18.10% calculated as nickel, respectively, while the purity of the nickel sulfate prepared in Comparative Examples 1-2 is 16.96% and 17.73% calculated as nickel, respectively. The purity of the nickel sulfate prepared in Examples 1-5 is significantly higher than that of Comparative Examples 1-2. Besides, the recovery rate of nickel sulfate in Examples 1-5 is also significantly higher than that of Comparative Examples 1-2. The purity and recovery rate of Examples 4-5 are lower than those of Examples 1-3, indicating that by using a low molar concentration of sulfuric acid solution and low temperature conditions, the present disclosure can selectively leaching nickel to further improve the purity and recovery rate of nickel sulfate.

The preferred embodiments of the present disclosure are described in detail above, but the present disclosure is not limited to the described embodiments. Those skilled in the art can make various equivalent modifications or substitutions without departing from the spirit of the present disclosure, and these equivalent modifications or substitutions are all included in the scope defined by the claims of this application.

The invention claimed is:

1. A method for directly preparing nickel sulfate using low nickel matte, comprising the following steps:
   a) pretreating low nickel matte to obtain ferronickel powder, wherein the pretreatment includes grinding and drying the low nickel matte to obtain ferronickel powder with a particle size of >200 mesh;
   b) mixing the ferronickel powder with sulfuric acid solution to obtain a mixture, stirring the mixture to dissolve, and then evaporating the dissolved mixture to obtain a supersaturated sulfate solution;
   c) cooling the supersaturated sulfate solution to −5 to 0° C. and filtering the cooled supersaturated sulfate solution with suction to obtain a precipitated solid;
   d) washing the precipitated solid with water to remove an insoluble residue to obtain a filtrate, and removing impurities from the filtrate to obtain nickel hydroxide precipitation; the removal of impurities includes successively removing iron, removing calcium and magnesium;
   e) water-washing, acid dissolving and evaporating the nickel hydroxide precipitate to obtain nickel sulfate; wherein step d) comprises:
      d1) washing the precipitated solid with water to remove an insoluble residue to obtain a filtrate; a solid-to-liquid ratio (w/v) of the precipitated solid to the water is 1: (4-8), a temperature of washing is 60-95° C.; mixing the filtrate with a dilute alkali solution to perform reaction, and then performing solid-liquid separation to obtain an iron-removed solution;
      d2) mixing the iron-removed solution with a dilute alkali solution and fluoride salt to perform reaction, and then performing solid-liquid separation to obtain a calcium- and magnesium-removed solution;
      d3) mixing the calcium- and magnesium-removed solution with a dilute alkali solution to perform reaction, and then performing solid-liquid separation to obtain nickel hydroxide precipitate.

2. The method for directly preparing nickel sulfate using low nickel matte according to claim 1, wherein in step a), a mass percentage of nickel in the low nickel matte is 5-20%.

3. The method for directly preparing nickel sulfate using low nickel matte according to claim 1, wherein step b) comprises: adding the ferronickel powder into an open container, and then adding the sulfuric acid solution to obtain a mixture, stirring the mixture to dissolve, and then evaporating the dissolved mixture to obtain a supersaturated sulfate solution; a solid-to-liquid ratio (w/v) of the ferronickel powder to the sulfuric acid solution is 1: (3-10), a molar concentration of the sulfuric acid solution is 0.01-0.08 mol/L, a temperature of the dissolution is 35-65° C., a temperature of the evaporation is 100-120° C., a time of the stirring is 20-60 min; the supersaturated sulfate solution comprises supersaturated nickel sulfate solution, supersaturated iron sulfate solution and supersaturated magnesium sulfate solution.

4. The method for directly preparing nickel sulfate using low nickel matte according to claim 3, wherein step c) comprises: after the temperature of the supersaturated sulfate solution in the open container has dropped to 20-25° C., cooling the supersaturated sulfate solution in the open container to −5 to 0° C., then removing an ice layer, and filtering off the solution with suction to obtain an precipitated solid; wherein the ice layer includes sulfuric acid, and the precipitated solid includes sulfate crystal.

5. The method for directly preparing nickel sulfate using low nickel matte according to claim 1, wherein in step d1), the dilute alkali solution is selected from sodium hydroxide solution, potassium hydroxide solution, lithium hydroxide solution, and barium hydroxide solution, and a molar concentration of the dilute alkali solution is 0.01-0.2 mol/L; a pH of the mixed reaction solution is 2.0-3.5 to control a potential of the filtrate at 0.25-0.4 V; a temperature of the reaction is 60-95° C.

6. The method for directly preparing nickel sulfate using low nickel matte according to claim 1, wherein in step d2), the dilute alkali solution is selected from sodium hydroxide solution, potassium hydroxide solution, lithium hydroxide solution, and barium hydroxide solution, and a molar concentration of the dilute alkali solution is 0.01-0.2 mol/L; the fluoride salt is selected from sodium fluoride and potassium fluoride; a pH of the mixed reaction solution is 4.8-5.5; a molar concentration ratio of the sum of magnesium ions and calcium ions to the fluoride ions in the mixed reaction solution is 1:1.5-5; a temperature of the reaction is 60-95° C.

7. The method for directly preparing nickel sulfate using low nickel matte according to claim 1, wherein in step d3), the dilute alkali solution is selected from sodium hydroxide solution, potassium hydroxide solution, lithium hydroxide solution, and barium hydroxide solution, and a molar concentration of the dilute alkali solution is 0.01-0.2 mol/L; a pH of the mixed reaction solution is 7.0-8.5.

\* \* \* \* \*